United States Patent [19]

Sebastian et al.

[11] Patent Number: 4,806,017
[45] Date of Patent: Feb. 21, 1989

[54] APPARATUS FOR THE CONTACTLESS MEASUREMENT OF GEOMETRICAL DIMENSIONS

[75] Inventors: Lothar Sebastian, Bochum; Kuno Guse, Dortmund, both of Fed. Rep. of Germany

[73] Assignee: Bochumer Eisenhütte Heintzmann GmbH & Co. KG, Bochum, Fed. Rep. of Germany

[21] Appl. No.: 36,296

[22] Filed: Apr. 9, 1987

[30] Foreign Application Priority Data

Apr. 9, 1986 [DE] Fed. Rep. of Germany ....... 3611896

[51] Int. Cl.$^4$ .............................................. G01B 11/00
[52] U.S. Cl. ......................................... 356/376; 356/1
[58] Field of Search ................................. 356/1, 4, 376

[56] References Cited

U.S. PATENT DOCUMENTS

3,588,249 6/1971 Studebaker ............................. 356/4
4,063,283 12/1977 Rider ....................................... 356/1

FOREIGN PATENT DOCUMENTS

2500458 7/1975 Fed. Rep. of Germany .
2810192 9/1978 Fed. Rep. of Germany .
2094470 9/1982 United Kingdom ................ 356/376

Primary Examiner—Richard A. Rosenberger
Attorney, Agent, or Firm—Toren, McGeady & Associates

[57] ABSTRACT

An apparatus for the contactless measurement of geometrical dimensions includes a light source emitting a light beam, a first deflector deflecting the light beam at an angle toward an object to be measured, a receiver receiving the light beam and a second deflector for deflecting the light beam reflected by the object toward the receiver. The second deflector rotates about an axis extending perpendicularly to the light beam reflected by the object. The axis of the light beam emitted by the light source extends parallel to the axis of rotation of the second deflector. The light beam conducted to the receiver extends coaxially to the axis or rotation of the second deflector. This apparatus requires no calibration, but only an adjustment. For measuring a distance it is sufficient if only the second deflector rotates. If both deflectors rotate, the second deflector must rotate at a substantially higher rate of rotation than the first deflector. The first deflector is vertically adjustable and lockable. Also, the unit formed by the light source, the two deflectors and the receiver may be rotatable about an axis and movable in longitudinal direction of the axis extending parallel to the axis of rotation of the second deflector.

11 Claims, 4 Drawing Sheets

APPARATUS FOR THE CONTACTLESS MEASUREMENT OF GEOMETRICAL DIMENSIONS

BACKGROUND OF THE INVENTION

1. Field of the Invention

The present invention relates to an apparatus for the contactless measurement of geometrical dimensions.

2. Description of the Prior Art

An apparatus of this type is known from German Offenlegungsschrift No. 28 10 192. In that apparatus, a focused light beam is projected from an emitter initially onto a deflector which rotates about an axis extending perpendicular to the axis of the light beam. The deflector projects the light beam onto an object to be measured in the same plane. The light beam is deflected by this object and is conducted to another rotating deflector from which the light beam is then conducted to a light-sensitive receiver. The deflector assigned to the receiver rotates about an axis which extends parallel to the axis of rotation of the deflector assigned to the emitter, however, the deflector assigned to the receiver rotates at a higher rate of rotation. The light beam is always conducted only in a single plane.

Since the distance between the axes of rotation of the deflectors is known, the angular positions of the deflectors relative to the object to be measured can be used, by an electronic evaluating system forming part of the apparatus, to determine, on the basis of the triangulation method within the given system of coordinates, the position of the point projected by the light beam on the object to be measured.

The known apparatus described above has the disadvantage that the light beam is conducted within a single plane. This means that the light beam emitted by the emitter usually does not meet the axis of rotation of the deflector assigned to the emitter. This is due to unavoidable technical deficiencies, such as, manufacturing tolerances, bearing play or the like. As a result, the direction of the beam deflected by the deflector does not coincide with the ideal direction. The angle error which is caused by this would be negligible if the sector covered by the light beam on the object to be measured were relatively small, i.e., if incoming and outgoing angles are small. However, when these angles increase, the inaccuracy of measurement also increases, particularly in the end locations of the sector covered by the light beam. Thus, in the known apparatus, the measuring accuracy is essentially satisfactory only if it is possible to move an object to be measured into the central range of the light beam sector.

Of course, it is possible to calibrate the known apparatus in order substantially to eliminate errors due to, for example, manufacturing tolerances or bearing play. However, the disadvantage of calibration resides in the fact that it is not only time-consuming and technically cumbersome, but is also relatively easily eliminated by external influences, such as, vibrations, impacts or the like.

It is, therefore, the primary object of the present invention to improve the apparatus of the type described above in such a way that in an apparatus of relatively simple construction a continuous contactless measurement can be ensured even over longer periods of time without calibration or re-calibration.

SUMMARY OF THE INVENTION

In accordance with the present invention, an apparatus for the contactless measurement of geometrical dimensions includes a light source emitting a focused monochromatic light beam, a first deflector for deflecting the light beam emitted by the light source at an angle to the object to be measured, a receiver sensibilized to the light beam meeting the object, and a second deflector for deflecting the light beam reflected by the object toward the receiver. The second deflector rotates about an axis extending perpendicularly to the light beam reflected by the object. An electronic evaluating system is provided for determining the desired geometrical dimensions on the basis of the triangulation method. The axis of the light beam emitted from the light source toward the first deflector extends parallel to the axis of rotation of the second deflector which is assigned to the receiver. The light beam incident in the receiver extends coaxially with the axis of rotation of the rotating second deflector. The receiver has a point-like sensitive portion.

In contrast to the known apparatus, in the apparatus according to the invention the light beam is conducted between the light source and the receiver no longer exclusively in a single plane. Rather, it is ensured that the light beam emitted by the light source, for example, a laser is conducted parallel to the axis of rotation of the rotating deflector and that the portion of the light beam received by the receiver also extends in this axis of rotation This is achieved by means of deflectors which deflect the light beam emitted by the light source by 90° into the plane of measurement and the portion of the light beam reflected by the object to be measured from the plane of measurement by 90° toward the receiver.

An apparatus in which the light beam is conducted in the above-described manner can be relatively easily adjusted and this adjustment can be maintained during the measurement operation because it is possible without problems to adjust the parallelism of the light beam emitted by the light source and the light beam received by the receiver as well as the coaxial alignment of the light beam received by the receiver in the axis of rotation of the second deflector. In principle, merely an adjustment of the axis of rotation is required, while a calibration is no longer necessary.

Another advantage of the present invention resides in the fact that a focused monochromatic beam is conducted onto a receiver which has a point-like sensitive portion, particularly a photodiode. Thus, the area of projection on the receiver is only very limited in size. As a result, it is automatically ensured that in case of a maladjustment of the apparatus due to whatever circumstances the portion of the light beam to be received by the receiver is no longer detected by the photodiode and, thus, the apparatus itself indicates that the apparatus no longer operates properly.

In the simplest embodiment of the invention, one of the deflectors is stationary and the other deflector rotates. Preferably, the deflector assigned to the light source is the stationary deflector. In this manner, a distance measurement can be carried out without problems utilizing the triangulation method. An example for the use of this embodiment of the invention is the measurement of sag of sheet metal in rolling mills.

According to another advantageous embodiment of the invention, at least one of the two deflectors is mounted so as to be adjustable and lockable in longitudinal direction of the light beam leaving the light source or in longitudinal direction of the light beam incident to the receiver. In this manner, the point of reflection of the light beam can be adjusted without problems. Preferably, the non-rotating or the slower rotating deflector is adjusted and then locked.

As already explained above, it is sufficient for a simple distance measurement to have only one of the two 90° deflectors rotate. However, if it is required to measure sections on a bending machine during a bending process, it is advantageous if the deflector assigned to the light source, i.e., the first deflector, is rotatable about an axis which extends parallel to the axis of rotation of the deflector which is assigned to the receiver, i.e., the second deflector, wherein the axis of rotation of the first deflector extends coaxially with the light beam emitted by the light source. It is important in this connection that the second deflector rotates faster, preferably substantially faster, than the first deflector, so that the receiver is sensibilized as frequently as possible during a time unit. This substantially increases the measuring accuracy.

In order to be able to measure specifically the contours of tunnels or underground drifts, the two deflectors are mounted in a common support or housing and the support is rotatable about an axis extending parallel to the axis of rotation of the second deflector. In this embodiment, one of the deflectors is made stationary and the other deflector may be rotatable It is also possible that both deflectors rotate. The axis of rotation of the support may preferably extend coaxially to the light beam emitted by the light source.

In accordance with another embodiment of the invention, the two deflectors are mounted in a common support or housing which is movable in longitudinal direction of the axis of rotation of the support. Thus, due to the translatory mobility of the support, it is also possible to measure three-dimensional objects by means of the apparatus according to the invention. In this case, it is advantageous if both deflectors rotate.

In accordance with a particularly advantageous embodiment of the invention, the deflectors are formed by prisms or mirrors having constant deflection angles. Particularly pentaprisms are useful because they ensure an excellent 90° deflection of the light beam. In order to be able to determine without problems the incoming and outgoing angles of the light beam in the plane of measurement, a pulse disk of an absolute or incremental generator is connected to at least the axis of rotation of the second deflector which rotates with a constant rate of rotation. In this case, initially the reflectors are aligned in such a way that a light beam emitted by the light source is conducted immediately in the receiver. This position of the deflector, particularly the deflector assigned to the receiver, corresponds to a certain position of the pulse disk. Thus, when the deflector rotates at a constant rate of rotation, the pulses at the receiver are in a certain time dependency to the pulses of the pulse disk which is the offset to be balanced. This dependency is input in the electronic evaluating system. The measuring speed and the measuring accuracy are dependent on the resolution of the absolute or incremental generator. In order to further increase the measuring accuracy, a pulse disk of a time delay generator is connected at least to the axis of rotation of the second deflector rotating with a constant rate of rotation. Accordingly, in this case, the absolute or incremental generator is replaced by a time delay generator. In this way, it is possible to vary the measuring speed and measuring accuracy dependent upon the requirements of the object to be measured in each instance. The resolution and accuracy of the time delay generator is dependent upon the uniformity of the rate of rotation and the oscillator frequency.

The various features of novelty which characterize the invention are pointed out with particularity in the claims annexed to and forming a part of this disclosure. For a better understanding of the invention its operating advantages and specific objects attained by its use, reference should be had to the drawings and descriptive matter in which there are illustrated and described preferred embodiments of the invention.

DETAILED DESCRIPTION OF THE INVENTION

Figure 1:
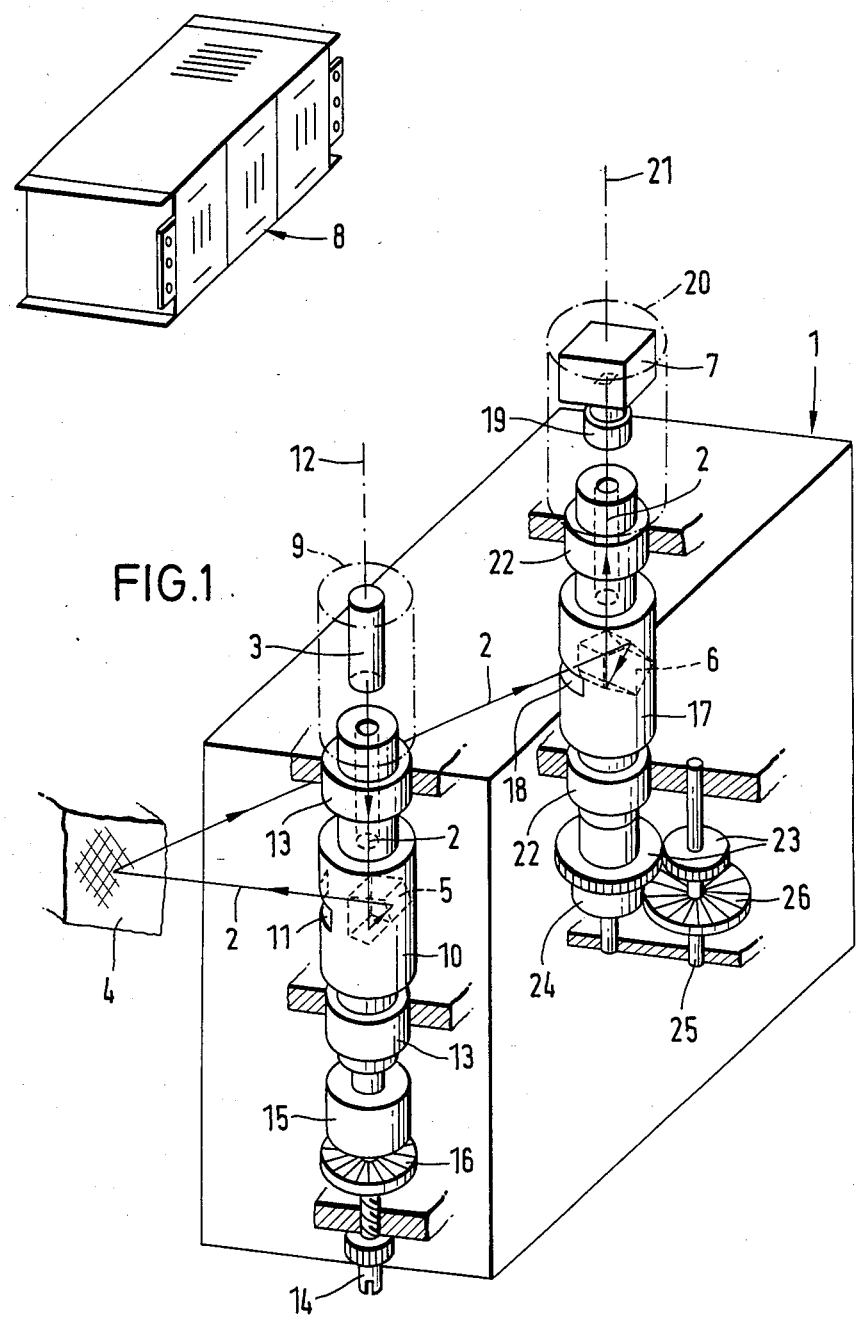
FIG. 1 is a perspective view of an apparatus for the contactless measurement of geometrical measurements according to the present invention.
Figure 2:
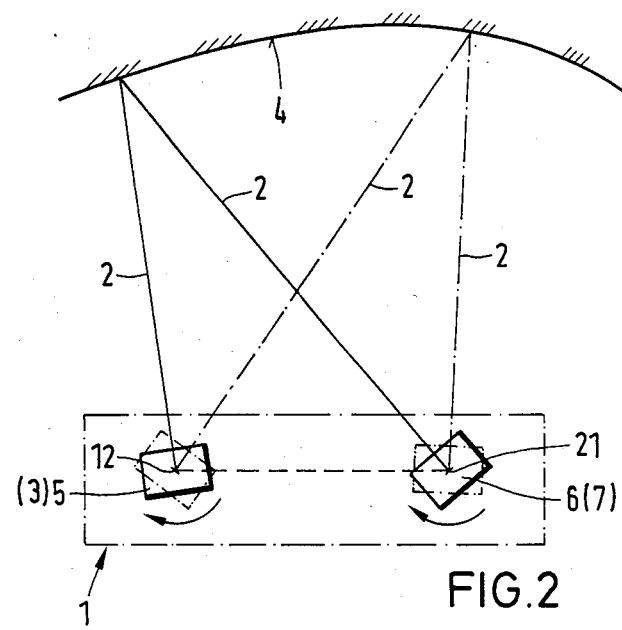
FIG. 2 is a schematic top view of the apparatus of FIG. 1.

The apparatus for the contactless measurement of geometric dimensions illustrated in FIGS. 1 and 2 of the drawing includes a housing-like bearing head 1, a light source which projects a focused monochromatic light beam 2, particularly a laser, a deflector 5 which deflects light beam 2 at an angle of 90° toward an object 4 to be measured, a second deflector 6 which projects the light beam 2 reflected from object 4 onto a receiver 7 in the form of a photodiode, and an electronic evaluating system 8.

The light source 3 is encapsulated in a housing 9. In the embodiment discussed below, the light source 3 emits a laser. The vertically downwardly directed laser beam 2 meets deflector 5 which is constructed as a pentaprism and is deflected by this pentaprism by exactly 90° from the vertical into the horizontal plane of measurement in which the object 4 to be measured is located. Deflector 5 is also encapsulated in a housing 10. Housing 10 has an outlet opening 11 for laser beam 2.

Deflector 5 rotates together with its housing 10 about a vertical axis 12 which is mounted in measuring head 1 through bearings 13.

Deflector 5 is vertically adjustable along axis of rotation 12 by means of an adjusting unit 14.

In addition, a step motor 15 and a coding or pulse disk 16 of an absolute or incremental generator are arranged on the axis of rotation 12 of the unit formed by the light source 3 and deflector 5.

The laser beam 2 reflected by the object 4 reaches deflector 6 which is constructed as a pentaprism. Deflector 6 is encapsulated in a housing 17 having an inlet opening 18. Deflector 6 deflects laser beam 2 through a lens 19 to a photodiode 7 which is encapsulated in a housing 20 and has a point-like sensitive portion.

Deflector 6 rotates together with its housing 17 about an axis 21 which extends parallel to the axis of rotation 12 of the units formed by light source 3 and deflector 5. Housing 17 is supported in measuring head 1 through bearing 22.

Deflector 6 rotates with a rate of rotation which is selected a multiple greater than the rate of rotation of deflector 5.

The unit composed of deflector 6 and receiver 7 has at its bottom end a drive motor 24. A pulse disk 26 of an absolute or incremental generator is fastened to a shaft 25 of a gearing unit 23.

Finally, the apparatus according to the invention further includes electronic evaluating system 8 which is connected, through electric connecting lines not shown in the drawing, to measuring head 1 for transmitting the relative angular positions of the deflectors 5 and 6 in accordance with the positions of generators 16 or 26.

Figure 3:
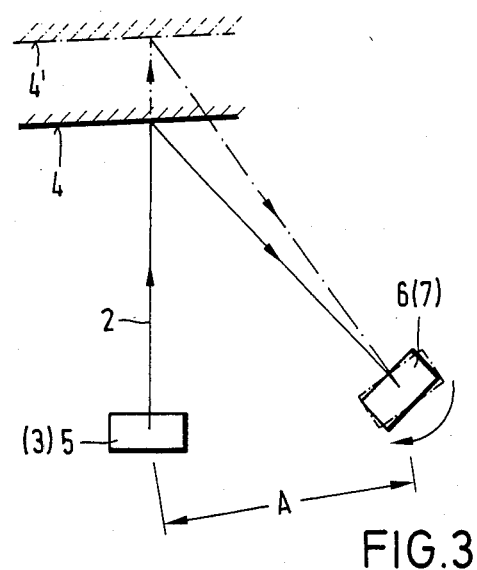
FIG. 3 is a schematic top view of another embodiment of the apparatus of FIG. 1.

For a simple distance measurement, it is sufficient if deflector 6 rotates and deflector 5 is standing still. This situation is illustrated in FIG. 3. A laser beam 2 emitted by light source 3 is deflected by deflector 5 and is projected onto object 4. Laser beam 2 is reflected by the object and conducted to deflector 6 which deflects the beam 2 by 90° and conducts it to the photodiode 7. Photodiode 7 receives a light pulse when the normal vector of the mirror surface of deflector 6 and the laser beam 2 extend in a common vertical plane. Since the spacing A between deflectors 5 and 6 is known, the distance to the objects 4, 4' to be measured can be determined by the electronic evaluating system 8 on the basis of the triangulation method.

FIG. 2 is a schematic view of the apparatus of FIG. 1 and illustrates as an example the measurement of curved contours 4 in accordance with a bending procedure. Since, in this case, an elongated object is to be measured, it is necessary to also rotate deflector 5, so that laser beam 2 can be moved along the entire object 4. Since, in this embodiment, deflector 6 rotates by a multiple faster than deflector 5, photodiode 7 receives a plurality of pulses as the laser beam 2 is conducted along object 4, always when the normal vector of the mirror surface of the deflector 6 and the laser beam 2 extend in a common vertical plane This is illustrated in dash-dotted lines in FIG. 2.

Figure 4:
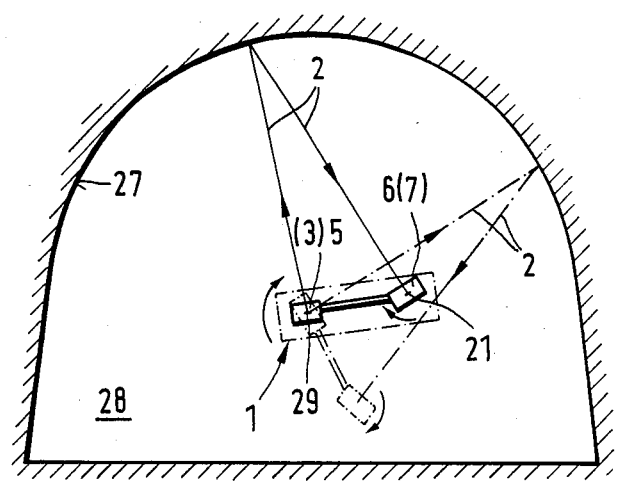
FIG. 4 is a schematic illustration of a possible use of the embodiment of FIG. 3.

FIG. 4 illustrates, for example, the use of the apparatus according to the present invention for measuring the contour 27 of an underground drift 28. In this case, the embodiment shown in FIG. 3 is used, however, the entire measuring head 1 together with light source unit 3, 5 and receiving unit 6, 7 are rotatable about an axis 29 which extends parallel to the axis of rotation 21 of deflector 6. Axis of rotation 29 extends in longitudinal direction of laser light source 3.

Figure 5:
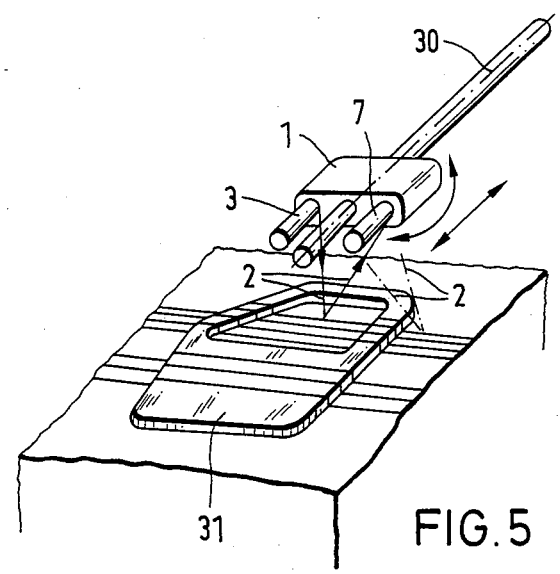
FIG. 5 is a perspective view of another embodiment of the apparatus of FIG. 1.

FIG. 5 shows an embodiment of the invention utilizing the apparatus illustrated in FIGS. 1 and 2. In this case, measuring head 1 does not only rotate about a longitudinal axis 30 but can also be moved in direction of this longitudinal axis 30. Thus, by superimposing the movements of the measuring head 1, three-dimensional objects 31 can also be exactly measured.

Figure 6:
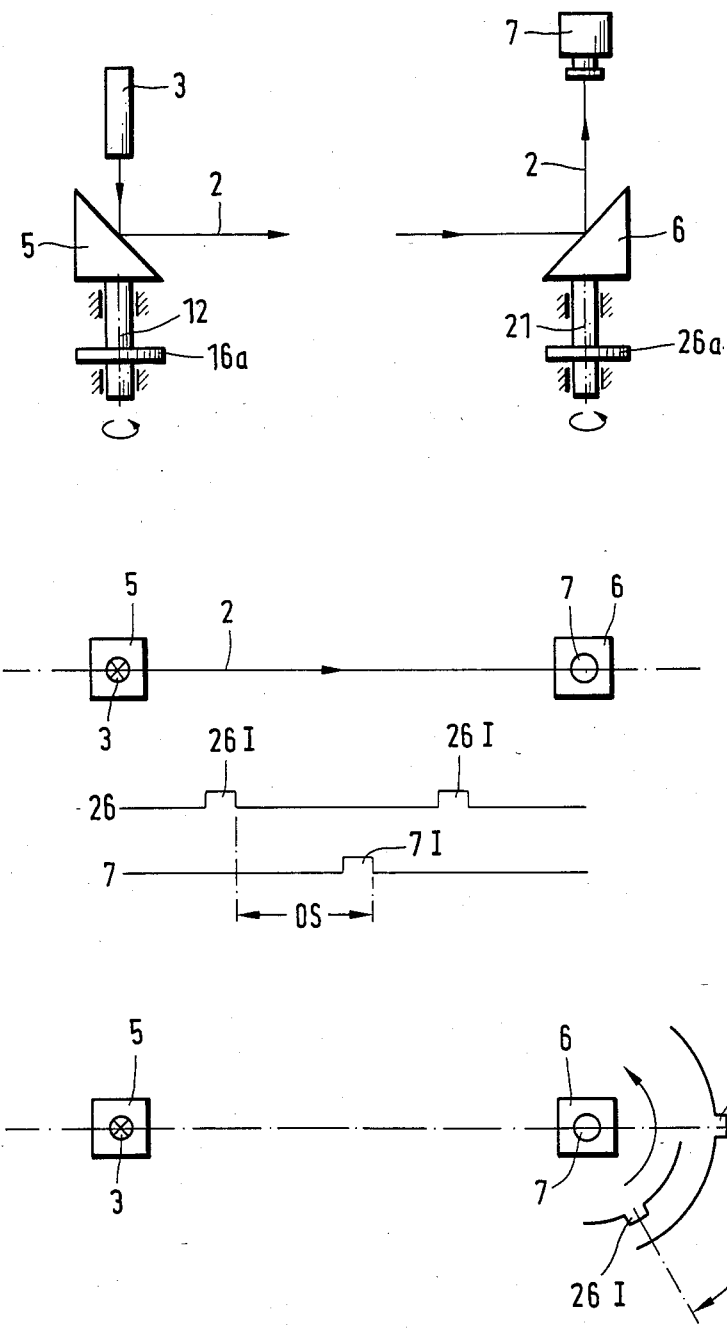
FIG. 6 schematically illustrates the adjustment of the apparatus of FIG. 1.

FIG. 6 illustrates the adjustment of the apparatus of FIG. 1.

FIG. 6 shematically shows laser light source 3, first deflector 5, second deflector 6 and photodiode 7. However, instead of the pulse disks 16, 26 of absolute or incremental generators, impulse disks 16a, 26a of time delay generators are shown.

When laser light source 3 is switched on, initially the two deflectors 5 and 6 are rotated about axes of rotation 12 and 21 until laser beam 2 is conducted exactly into photodiode 7.

Second deflector 6 is now rotated together with pulse disk 26a at a constant rate of rotation. Depending upon the position of the pulse disk 26a and the pulse 26 I generated by the pulse disk 26a, a pulse configuration results with a constant offset OS to be balanced. The pulse of the time delay generator is denoted by reference numeral 26 I and the pulse of receiver 7 is denoted by reference numeral 7 I.

Following the balancing at axis 21, the same procedure can be followed with respect to deflector 5 on the other axis 12.

While specific embodiments of the invention have been shown and described in detail to illustrate the application of the inventive principles, it will be understood that the invention may be embodied otherwise without departing from such principles.

We claim:

1. An optical apparatus for the contactless measurement of distances with the triangulation method, comprising a light source emitting a focused monochromatic light beam, a first deflector for deflecting the light beam at an angle toward an object to be measured, a receiver having a point-like sensitive portion sensibilized to the light beam meeting the object, a second deflector for deflecting the light beam reflected by the object toward the receiver, the second deflector rotating about an axis extending perpendicularly to the triangulation plane, electronic evaluating means for determining the distance to be measured on the basis of the triangulation method, wherein the axis of the light beam emitted by the light source toward the first deflector extends perpendicularly to the triangulation plane and parallel to the axis of rotation of the second deflector, and wherein the light beam conducted from the second reflector to the receiver extends coaxially to the axis of rotation of the second deflector.

2. The apparatus according to claim 1, wherein the first reflector is mounted adjustable and lockable in longitudinal direction of the light beam emitted by the light source.

3. The apparatus according to claim 1, wherein the second deflector is mounted adjustable and lockable in longitudinal direction of the light beam conducted into the receiver.

4. The apparatus according to claim 1, wherein the first deflector is rotatable about an axis which extends parallel to the axis of rotation of the second deflector and coaxially to the axis of the light beam emitted by the light source.

5. The apparatus according to claim 1, comprising a support means for the first and second deflectors, wherein the support means is rotatable about an axis extending parallel to the axis of rotation of the second deflector.

6. The apparatus according to claim 5, wherein the support means is movable in longitudinal direction of the axis of rotation of the support means.

7. The apparatus according to claim 1, wherein the deflectors are prisms.

8. The apparatus according to claim 7, wherein the prisms are pentaprisms.

9. The apparatus according to claim 1, wherein the deflectors are mirrors.

10. The apparatus according to claim 1, comprising a pulse disk of an absolute or incremental generator connected to the axis of rotation of the second deflector, wherein the second deflector rotates at a constant rate of rotation.

11. The apparatus according to claim 1, comprising a pulse disk of a time delay generator connected to the axis of rotation of the second deflector, wherein the second deflector rotates at a constant rate of rotation.

* * * * *